United States Patent Office 3,637,653
Patented Jan. 25, 1972

3,637,653
PHENYL-AZO-PHENYL DYESTUFFS
Hanswilli von Brachel, Offenbach am Main, Dieter Cornelius, Darmstadt-Arheilgen, and Eberhard Stier, Frankfurt am Main, Germany, assignors to Cassella Farbwerke Mainkur Aktiengesellschaft, Frankfurt am Main, Germany
No Drawing. Filed Oct. 8, 1968, Ser. No. 765,983
Claims priority, application Germany, Oct. 13, 1967, C 43,559
Int. Cl. C07c 107/06; C07b 29/06
U.S. Cl. 260—207          2 Claims

ABSTRACT OF THE DISCLOSURE

Dyestuffs of the formula:

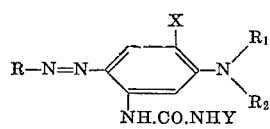

wherein R is the residue of a diazo component of a benzene or heterocyclic series free of water solubilizing substituent groups, $R_1$ and $R_2$ are aliphatic substituents, Y is an aliphatic or aromatic substituent and X is hydrogen or aliphatic and the utility thereof particularly in dyeing and printing of synthetic textile materials.

---

It has been found that valuable water-insoluble mono-azo-dyestuffs are represented by the following general formula:

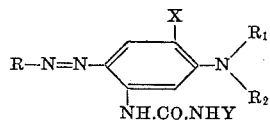

wherein R is the residue of a diazo component of the benzene or heterocyclic series free of water-solubilizing substituent groups; $R_1$ and $R_2$ are alkyl, alkenyl, aralkyl, hydroxyalkyl, alkoxyalkyl, acyloxyalkyl, carbalkoxyalkyl, carbamidooxyalkyl, carbamidoalkyl, carbamidoaminoalkyl, alkylsulfonylalkyl or cyanoalkyl; Y is alkyl, alkenyl, chloroalkyl, aralkyl, cycloalky, bicycloalkyl, aryl or chloroaryl and X is hydrogen, alkyl or alkoxy. These dyestuffs are produced by coupling 1 mol of the diazo compound of an amine of the general formula $R.NH_2$, free of water-solubilizing groups, with 1 mol of a tertiary amine of the general formula:

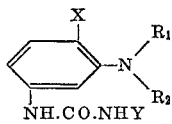

wherein R, $R_1$, $R_2$, X and Y are as aforesaid. Preferred dyestuffs are obtained when the alkyl moieties of the aforesaid substituents contain a maxium of about 8 carbon atoms.

The dyestuffs produced according to this invention are suitable for dyeing and printing of textile materials on a base of cellulose esters, synthetic polyamides and polyacrylonitrile and yield in this connection dyeings and prints which excel in fastness properties.

The dyeing and printing of the above-named textile materials with the dyestuffs produced according to this invention is accomplished by known processes. The temperatures of the dyestuffs in aqueous dispersion at normal pressure should be 95–100° C., or, at increased pressure, 104–140° C. In using temperatures of 100° C., it is preferable to add carrier agents to the dye bath. As such agents there can be introduced, for example, aromatic hydrocarbons such as diphenyl, aromatic halogen compounds such as chlorobenzenes, aromatic carbonic acids such as benzoic acid and salicylic acid, phenols such as o- and p-phenylphenols and esters such as terephthalic acid ester. Instead of the dyeing from the bath, a hot-air fixing of the dyestuffs can also be undertaken at temperatures of 200–230° C. The printing can be carried out in such a manner that the printed goods are steamed in the presence of a carrier at temperatures between about 80–100° C. or in the absence of a carrier at about 110–140° C. or are treated according to the so-called thermofixing process at about 170–230° C.

A particularly high affinity is demonstrated by the claimed dyestuffs for aromatic polyester materials such as, for example, polyethylene glycol terephthalate. They yield, in this connection, dyes or prints of very good fastness to light and extremely good sublimation fastness.

As the diazo components, the following can be introduced, for example:

2-chloroaniline,
2-chloro-6-methylaniline,
4-bromoaniline,
2,5-dichloraniline,
2,4-di-bromoaniline,
2,4,5-trichloroaniline,
2,4,6-tribromoaniline,
4-nitroaniline,
4-cyanoaniline,
4-methylsulfonylaniline,
2-chloro-4-nitroaniline,
2-bromo-4-nitroaniline,
2-cyano-4-nitroaniline,
2-methylsulfonyl-4-nitroaniline,
4-chloro-3-nitroaniline,
4-cyano-3-nitroaniline,
3-chloro-6-cyanoaniline,
2-cyano-4-chloroaniline,
2-bromo-4-methylsulfonylaniline,
2-cyano-4-methylsulfonylaniline,
2-ethoxy-4-nitroaniline,
2,4-dinitroaniline,
2-4-dicyanoaniline,
2-chloro-4-cyanoaniline,
3-chloro-4-cyanoaniline,
2,5-dicyanoaniline,
3,4-dicyanoaniline,
2,6-dichloro-4-nitroaniline,
2,6-dibromo-4-nitroaniline,
2,4-dinitro-6-chloroaniline,
2,4-dinitro-6-bromoaniline,
2,6-dibromo-4-cyanoaniline,
2,6-dibromo-4-methylsulfonylaniline,
2-chloro-4-nitro-6-cyanoaniline,
2-bromo-4-nitro-6-cyanoaniline,
2-bromo-4-nitro-6-methylsulfonylaniline,
2,4-dinitro-6-cyanoaniline
2-chloro-4-cyano-5-nitroaniline,
2-bromo-4-nitro-6-methoxyaniline,
2-methyl-4,6-dicyanoaniline,
2-chloro-4,6-dicyanoaniline,
2,6-dicyano-4-nitroaniline,
2-amino-3-nitro-5-acetylthiophene,
2-amino-5-nitrothiazole,
2-aminobenzthiazole,
2-amino-6-cyanobenzthiazole,
2-amino-6-methylsulfonylbenzthiazole,
3-aminopyridine,
5-aminopyrimidine,
2-amino-5-alkylsulfonylthiazole,
2-amino-5-carbonamido-thiazole, 2-amino-5-cyanothiazole,
2-amino-5-nitroisothiazole,
2-amino-5-nitrothiadiazole,
2-amino-5-sulfonamidothiadiazole.

As the developing components there can be introduced, for example:

1-N,N-diethylamino-3-methylaminocarbonylaminobenzene,
1-N,N-diethylamino-3-ethylaminocarbonylaminobenzene,
1-N,N-diethylamino-3-isobutylaminocarbonylaminobenzene,
1-N,N-diethylamino-3-allylaminocarbonylaminobenzene,
1-N,N-diethylamino-3-methallylaminocarbonylaminobenzene,
1-N,N-diethylamino-3-crotylaminocarbonylaminobenzene,
1-N,N-diethylamino-3-chloroethylaminocarbonylaminobenzene,
1-N,N-diethylamino-3-(β-chloropropyl)-aminocarbonylaminobenzene,
1-N,N-diethylamino-3-benzylaminocarbonylaminobenzene,
1-N,N-diethylamino-3-cyclopentylaminocarbonylaminobenzene,
1-N,N-diethylamino-3-cyclohexylaminocarbonylaminobenzene,
1-N,N-diethylamino-3-cyclopentenylaminocarbonylaminobenzene,
1-N,N-diethylamino-3-cyclohexenylaminocarbonylaminobenzene,
1-N,N-diethylamino-3-bicycloheptylaminocarbonylaminobenzene,
1-N,N-diethylamino-3-bicycloheptenylaminocarbonylaminobenzene,
1-N,N-diethylamino-3-bicycloheptylmethylaminocarbonylaminobenzene,
1-N,N-diethylamino-3-bicycloheptenylmethylaminocarbonylaminobenzene,
1-N,N-diethylamino-3-phenylaminocarbonylaminobenzene,
1-N,N-diethylamino-3-(p-chlorophenyl)-aminocarbonylaminobenzene,
1-N,N-diethylamino-3-(o- and p-dichlorophenyl)-aminocarbonylaminobenzene,
1-N,N-diethylamino-3-ethylaminocarbonylamino-6-methylbenzene,
1-N,N-diethylamino-3-ethylaminocarbonylamino-6-methoxybenzene,
1-N,N-diethylamino-3-ethylaminocarbonylamino-6-ethoxybenzene,
1-N,N-diethylamino-3-allylaminocarbonylamino-6-methylbenzene,
1-N,N-diethylamino-3-allylaminocarbonylamino-6-methoxybenzene,
1-N,N-diethylamino-3-phenylaminocarbonylamino-6-methylbenzene,
1-N,N-diethylamino-3-phenylaminocarbonylamino-6-ethoxybenzene,
1-N,N-dimethylamino-3-ethylaminocarbonylaminobenzene,
1-N,N-dimethylamino-3-allylaminocarbonylaminobenzene,
1-N,N-dimethylamino-3-phenylaminocarbonylaminobenzene,
1-N-ethyl-N-benzylamino-3-ethylaminocarbonylaminobenzene,
1-N-ethyl-N-benzylamino-3-allylaminocarbonylaminobenzene,
1-N-ethyl-N-benzylamino-3-phenylaminocarbonylaminobenzene,
1-N-ethyl-N-cyanoethylamino-3-ethylaminocarbonylaminobenzene,
1-N-ethyl-N-cyanoethylamine-3-allylaminocarbonylaminobenzen,
1-N-ethyl-N-cyanoethylamino-3-phenylaminocarbonylaminobenzene,
1-N-ethyl-N-hydroxyethylamino-3-ethylaminocarbonylaminobenzene,
1-N-ethyl-N-hydroxyethylamino-3-allylaminocarbonylaminobenzene,
1-N-ethyl-N-hydroxyethylamino-3-phenylaminocarbonylaminobenzene,
1-N-phenethyl-N-hydroxyethylamino-3-ethylaminocarbonylaminobenzene,
1-N-phenethyl-N-hydroxyethylamino-3-allylaminocarbonylaminobenzene,
1-N-phenethyl-N-hydroxyethylamino-3-phenylaminocarbonylaminobenzene,
1-N-hydroxyethyl-N-cyanoethylamino-3-ethylaminocarbonylaminobenzene,
1-N-hydroxyethyl-N-cyanoethylamino-3-allylaminocarbonylaminobenzene,
1-N-hydroxyethyl-N-cyanoethylamino-3-phenylaminocarbonylaminobenzene,
1-N-cyanoethylamino-3-ethylaminocarbonylaminobenzene,
1-N-cyanoethylamino-3-allylaminocarbonylaminobenzene,
1-N-cyanoethylamino-3-phenylaminocarbonylaminobenzene,
1-N-phenethylamino-3-ethylaminocarbonylaminobenzene,
1-N-phenethylamino-3-allylaminocarbonylaminobenzene,
1-N-phenethylamino-3-phenylaminocarbonylaminobenzene,
1-N,N-dihydroxyethylamino-3-ethylaminocarbonylaminobenzene,
1-N,N-dihydroxyethylamino-3-allylaminocarbonylaminobenzene,
1-N,N-dihydroxyethylamino-3-phenylaminocarbonylaminobenzene,
1-N,N-diacetoxyethylamino-3-ethylaminocarbonylaminobenzene,
1-N,N-diacetoxyethylamino-3-allylaminocarbonylaminobenzene,
1-N,N-diacetoxyethylamino-3-phenylaminocarbonylaminobenzene,
1-N-ethyl-N-methoxyethylamino-3-ethylaminocarbonylaminobenzene,
1-N-ethyl-N-methoxyethylamino-3-phenylaminocarbonylaminobenzene,
1-N-ethyl-N-carbmethoxyethylamino-3-ethylaminocarbonylaminobenzene,
1-N-ethyl-N-carbmethoxyethylamino-3-phenylaminocarbonylaminobenzene,
1-N-ethyl-N-methylsulfonylethylamino-3-ethylaminocarbonylaminobenzene,
1-N-ethyl-N-methylsulfonylethylamino-3-allylaminocarbonylaminobenzene,
1-N-ethyl-N-acetylaminoethylamino-3-ethylaminocarbonylaminobenzene,
1-N-ethyl-N-acetylaminoethylamino-3-phenylaminocarbonylaminobenzene,
1-N-ethyl-N-ethoxycarbonyloxyethylamino-3-ethylaminocarbonylaminobenzene,
1-N-ethyl-N-ethoxycarbonyloxyethylamino-3-phenylaminocarbonylaminobenzene,
1-N-ethyl-N-ethylaminocarbonyloxyethylamino-3-ethylaminocarbonylaminobenzene,
1-N-ethyl-N-allylaminocarbonyloxyethylamino-3-allylaminocarbonylaminobenzene,
1-N-cyanoethyl-N-ethoxycarbonyloxyethylamino-3-phenylaminocarbonylaminobenzene,
1-N-cyanoethyl-N-ethylaminocarbonyloxyethylamino-3-ethylaminocarbonylaminobenzene, 1-N-cyanoethyl-N-allylaminocarbonyloxyethylamino-3-allylaminocarbonylaminobenzene,
1-N,N-diacetoxyethylamino-3-phenylaminocarbonylamino-6-methoxybenzene,
1-N-cyanoethyl-N-oxyethylamino-3-allylaminocarbonylamino-6-methoxybenzene,
1-N-ethyl-N-ethylaminocarbonyloxyethylamino-3-ethylaminocarbonylamino-6-methoxybenzene.

The dyestuffs produced according to the invention, which contain in the diazo component in the o-positions to the azo group 1 or 2 halogen atoms, particularly chlorine and bromine atoms, can be converted to the corresponding dyestuffs containing 1 or 2 nitrile groups by conversion with cyanides in the presence of copper (I) compounds according to the teaching of French Pat. 1,524,647.

EXAMPLE 1

78.6 g. 2,4-dinitro-6-aniline bromide are added at 15–20° C. to nitrosyl-sulfuric acid (prepared from 23 g. sodium nitrite and 277 g. (66° Bé.) sulfuric acid). After a 3 hour stirring at 15° C., this is poured over 600 g. ice. Excess nitrite is broken down by addition of amino sulfo acid. The filtered solution is added to a solution of 70.5 g. 1-N,N-diethylamino-3-ethylaminocarbonylamino - benzene in 600 ml. 1-N-sulfuric acid and strongly thinned with water. The thus precipitated dyestuff is drawn off, washed and dried. It dyes polyester fibers in blue-violet hues.

Dyestuffs, which dye the polyester fibers in a similar shade, are obtained if, instead of the above-employed developing component, one employs amines of the following structure:

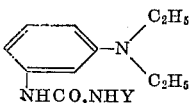

wherein Y is —CH$_3$, —CH$_2$—CH(CH$_3$)$_2$,

—CH$_2$—CH=CH—CH$_3$

—CH$_2$—CH$_2$·Cl, —CH$_2$CH·Cl—CH$_3$,

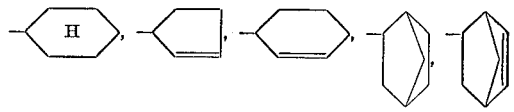

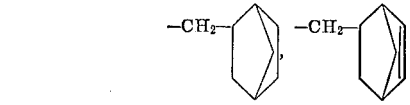

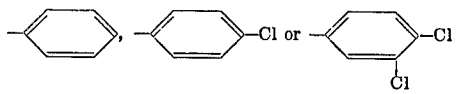

Dyestuffs, which dye polyester fibers in marine blue hues are obtained if, as the coupling components, marines are used of the following structure:

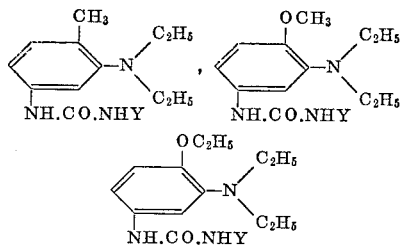

wherein Y has the meaning given immediately above.

In the following table, further novel dyestuffs are described:

| | Diazo component | Coupling component | Color on polyester fibers |
|---|---|---|---|
| 1 | O$_2$N—⟨Cl,Cl⟩—NH$_2$ | ⟨N(C$_2$H$_5$)$_2$⟩, NH.CO.NH.C$_2$H$_5$ | Violet |
| 2 | O$_2$N—⟨Br,Br⟩—NH$_2$ | Same as above | Do. |
| 3 | NC—⟨Br,Br⟩—NH$_2$ | ---do--- | Do. |
| 4 | H$_3$C.O$_2$S—⟨Br,Br⟩—NH$_2$ | ---do--- | Do. |
| 5 | O$_2$N—⟨Cl,CN⟩—NH$_2$ | ---do--- | Blue. |
| 6 | O$_2$N—⟨Br,CN⟩—NH$_2$ | ---do--- | Do. |

TABLE—Continued

| | Diazo component | Coupling component | Color on polyester fibers |
|---|---|---|---|
| 7 | $O_2N-\underset{NO_2}{\overset{CN}{\bigcirc}}-NH_2$ | ..do.. | Do. |
| 8 | $O_2N-\underset{CN}{\overset{CN}{\bigcirc}}-NH_2$ | ..do.. | Do. |
| 9 | $H_3C.O_2S-\underset{NO_2}{\overset{Br}{\bigcirc}}-NH_2$ | ..do.. | Violet. |
| 10 | $NC-\underset{CN}{\overset{Cl}{\bigcirc}}-NH_2$ | ..do.. | Do. |
| 11 | $O_2N-\underset{OCH_3}{\overset{Br}{\bigcirc}}-NH_2$ | ..do.. | Do. |

Dyestuffs, which dye the polyester fibers in a similar shade, are obtained, if instead of the above-employed coupling component, amines are used of the following structure:

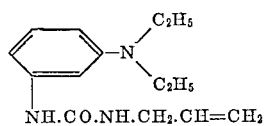 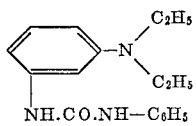

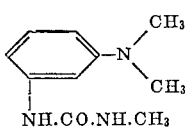

The dyestuff described in the preceding table under No. 7 can also be prepared in a manner in which 50.8 g. of the dyestuff, prepared according to paragraph 1 of this example, are introduced into a mixture of 150 g. dimethylformamide, 9 g. copper (1) cyanide and 1 g. sodium cyanide, and the reaction mixture is heated to 50° C. for 15 minutes. In cooling, the dyestuff precipitates and can be isolated by drawing off, washing with little dimethyl formamide and with much water and by subsequent drying. Thus, there are obtained 40 g. of 2,4-dinitro - 6 - cyano-1-[4'-diethylamino-2'-ethylaminocarbonlaminophenylazo]-benzene, which dyes polyester fibers in finely dispersed form in blue shades.

EXAMPLE 2

24.2 g. of 2-bromo-4-nitro-6-cyanoaniline are introduced at 15–20° C. into 75 ml./sulfuric acid in which 7 g. sodium nitrite is dissolved. This is stirred for two hours at 15–20° C., poured on 300 g. ice and the excess of nitrite is broken down with aminosulfonic acid and then filtered. The filtered solution is introduced into a solution of 32.3 g. 1-N-ethyl-N-ethylaminocarbonyloxyethylamino-3-ethylaminocarbonylamino-benzene in 200 ml. 1-n-sulfuric acid and diluted with 300 g. ice. The resulting dyestuff is isolated in customary fashion. It dyes polyester fibers in blue shades.

In the same manner are obtained the following dyestuffs which dye the polyester fibers in the given shade:

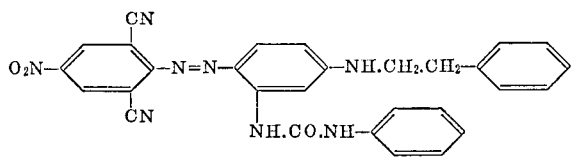

marine blue

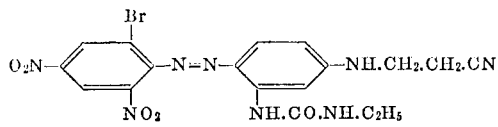

blue violet

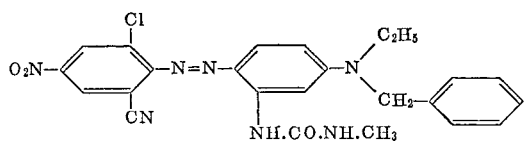

blue

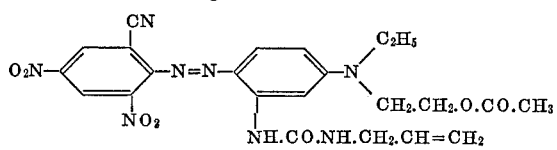 blue
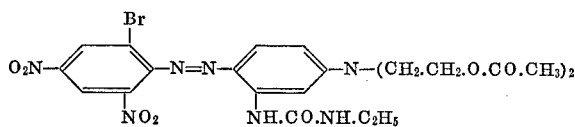 blue violet
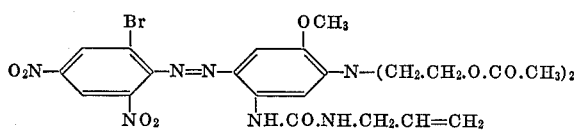 marine blue
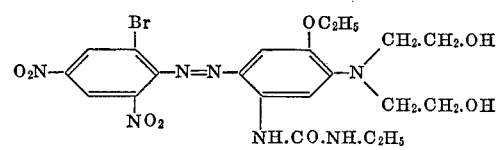 marine blue
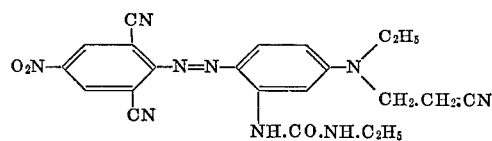 blue violet
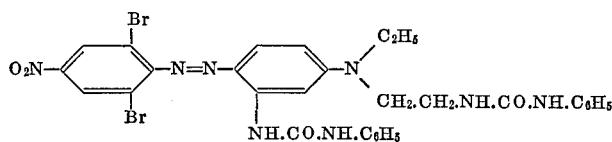 brown violet
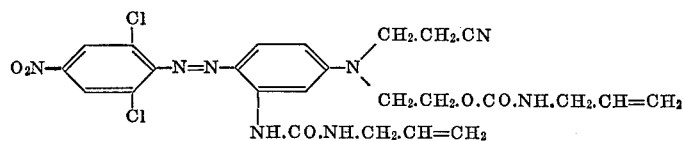 brown violet
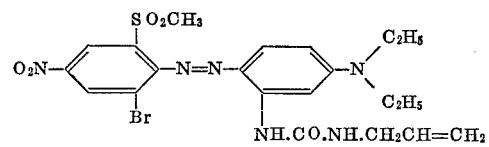 blue violet
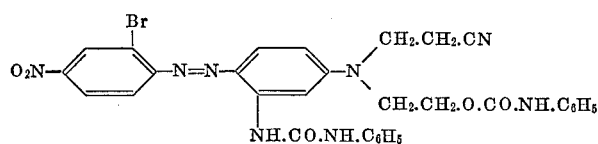 red
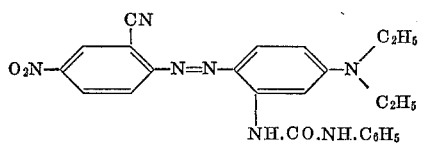 violet
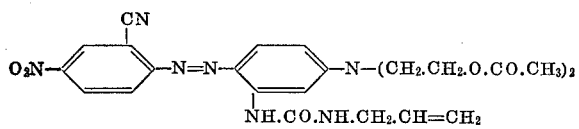 red violet
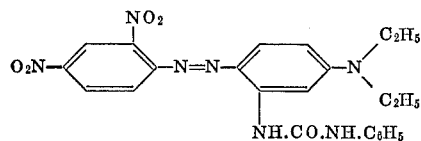 violet

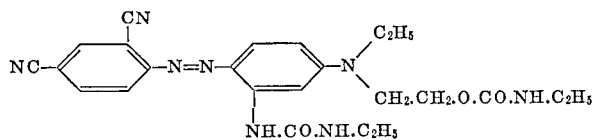 red

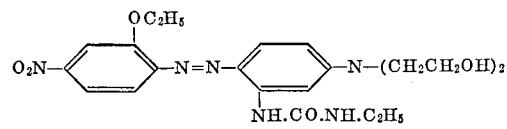 purplish red

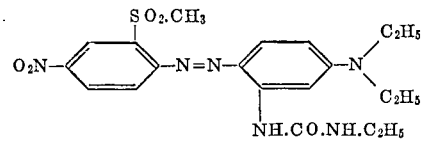 violet

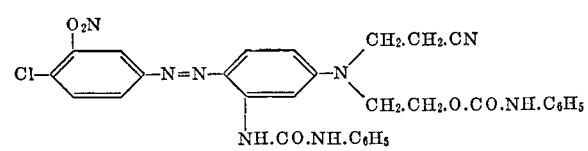 orange

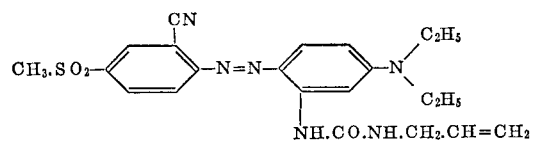 ruby

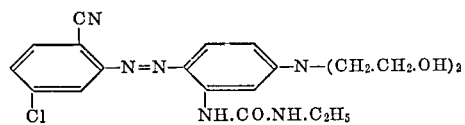 orange

EXAMPLE 3

A hydrochloride of diazonium salt solution of 13.8 g. p-nitroaniline is allowed to go into a hydrochloric acid solution of 44.3 g. 1-N-cyanoethyl-N-phenylamino-carbonyl - oxyethylamino-3-phenylamino-carbonyl-aminobenzene. The resulting dyestuff is filtered off, washed and dried. It dyes polyester fibers in organe shades.

If p-nitroaniline is substituted by p-methylsulfonyl-aniline or p-aminobenzonitrile, dyestuffs are obtained which color the polyester fibers also in organe shades.

If p-nitroaniline is substituted by 2-chloro-6-methyl-aniline or p-bromoaniline, dyestuffs are obtained which dye the polyester fibers yellow-gold shades.

EXAMPLE 4

At 0–5° C., 14.5 g. 2-amino-5-nitrothiazole are introduced into a mixture of 75 ml. sulfuric acid, in which 7 g. sodium nitrite are dissolved, and 150 ml. glacial acetic acid/propionic acid (85:15). This is stirred for two hours at 0–5° C. and the excess of nitrite is broken down by addition of urea. The resulting diazo solution is allowed to go into a solution of 28.3 g. 1-N,N-diethylamino-3-phenylamino-carbonyl-aminobenzene in 100 ml. glacial acetic acid and the dyestuff is precipitated by addition of 500 g. ice. It dyes the polyester fibers in very rich reddish blue shades.

Dyestuffs, which dye the polyester fibers in entirely similar shades, are obtained if in the above example there are employed as the coupling component 1-N,N-diethylamino-3-ethylaminocarbonylaminobenzene or 1-N,N-diethylamino-3-allylaminocarbonylaminobenzene, or 1-N-ethyl-N-phenethylamino-3-phenylaminocarbonylaminobenzene or 1 - N - ethyl-N-ethylaminocarbonyloxyethylamino-3-ethyl-aminocarbonylaminobenzene.

A dyestuff, which dyes the polyester fibers in a greenish blue shade, is obtained if there are used as the coupling component 1 - N,N - diethylamino - 3 - phenylaminocarbonylamino - 6 - ethoxybenzene. Dyestuffs, which dye the polyester fibers in bluish violet shades, are obtained if there is introduced as the developing component 1-N,N-diacetoxyethyl - 3 - allylaminocarbonylaminobenzene or 1-N-cyanoethyl-N-ethylamino - 3 - ethylaminocarbonyl-aminobenzene or 1 - N - oxyethylamino-3-ethylaminocarbonylaminobenzene.

In the same manner are obtained the following dyestuffs, which dye the polyester fibers in the given shade:

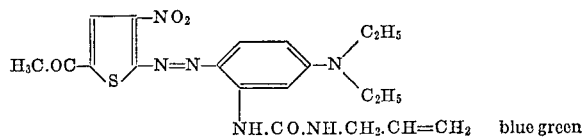 blue green

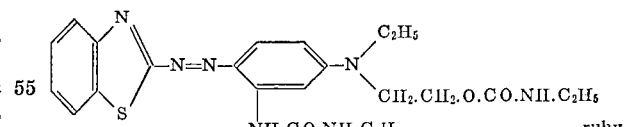 ruby

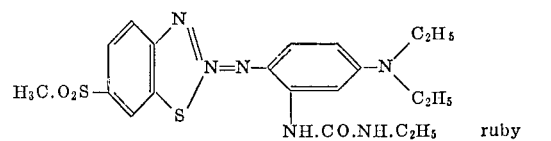 ruby

EXAMPLE 5

At 50° C., 25 g. of a polyethylene glycol terephthalic yarn are introduced into a dye bath, standardized with acetic acid to pH 5, which per liter contains 1 g. lauryl sulfate and 0.5 g. of the dyestuff in finely dispersed form described in Example 1, paragraph 1. The dye bath is then heated to 125–130° C. within 45 minutes and left at this temperature for 90 minutes. The thus-dyed material is subsequently treated by reduction for 20–30 minutes at 60–70° C. with a dye liquor which contains 4 ccm./l soda lye (38° Bé) and 2 g./l. sodium dithionite.

What is claimed is:
1. A water insoluble monoazodyestuff of the formula

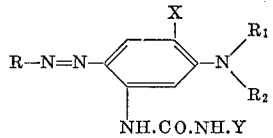

wherein R is the residue of a diazo component of the benzene series free of water-solubilizing substituent groups; $R_1$ is hydrogen or methyl, ethyl, benzyl phenethyl, hydroxyethyl, methoxyethyl, acetoxyethyl, ethylaminocarbonyloxyethyl, phenylaminocarbonyloxyethyl, allylaminocarbonyloxyethyl, acetylaminoethyl, phenylaminoethyl, ethoxycarbonyloxyethyl, methylsulfonylethyl or cyanethyl; $R_2$ is methyl, ethyl, benzyl, phenethyl, hydroxyethyl, methoxyethyl, acetoxyethyl, ethylaminocarbonyloxyethyl, phenylaminocarbonyloxyethyl, allylaminocarbonyloxyethyl, acetylaminoethyl, phenylaminocarbonylaminoethyl, ethoxycarbonyloxyethyl, methylsulfonylethyl or cyanethyl; Y is alkyl having from 1 to 4 carbon atoms, allyl, methallyl, crotyl, chlorethyl, chlorpropyl, benzyl, cyclopentyl, cyclopentenyl, cyclohexyl, cyclohexenyl, bicycloheptyl, bicycloheptenyl, bicycloheptylmethyl, bicycloheptenylmethyl, phenyl, chlorphenyl or dichlorphenyl; and X is hydrogen, methyl, ethyl, methoxy or ethoxy.

2. The monoazodyestuff of claim 1 wherein R is phenyl substituted with at least one substituent selected from the group consisting of —CN, —Br, —$NO_2$, —Cl, —$SO_2CH_3$ and —$OC_2H_5$.

References Cited
UNITED STATES PATENTS 3,335,126  8/1967  Baron et al. _____ 260—207 X
3,406,165  10/1968  Kruckenberg _____ 260—207.1
3,445,454  5/1969  Fishwick et al. ____ 260—207 X CHARLES B. PARKER, Primary Examiner
C. F. WARREN, Assistant Examiner U.S. Cl. X.R.
8—41 A, 41 B, 50; 260—152, 156, 158, 207.1